United States Patent
Yoshii et al.

(10) Patent No.: US 7,062,679 B2
(45) Date of Patent: Jun. 13, 2006

(54) COMPUTER RECOVERY SUPPORTING APPARATUS AND METHOD, AND COMPUTER RECOVERY SUPPORTING PROGRAM

(75) Inventors: Jun Yoshii, Nagoya (JP); Toshitaka Hasegawa, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 10/101,273

(22) Filed: Mar. 20, 2002

(65) Prior Publication Data

US 2003/0084383 A1 May 1, 2003

(30) Foreign Application Priority Data

Oct. 29, 2001 (JP) .............................. 2001-331365

(51) Int. Cl.
*G06F 11/00* (2006.01)

(52) U.S. Cl. .......................... 714/38; 714/37

(58) Field of Classification Search ................... 714/2, 714/57, 37, 38
See application file for complete search history.

(56) References Cited

U.S. PATENT DOCUMENTS

| 6,363,494 B1 * | 3/2002 | Farah ............................ 714/2 |
| 6,453,435 B1 * | 9/2002 | Limon et al. ................ 714/724 |
| 6,826,707 B1 * | 11/2004 | Stevens ......................... 714/2 |

* cited by examiner

*Primary Examiner*—Scott Baderman
*Assistant Examiner*—Timothy M Bonura
(74) *Attorney, Agent, or Firm*—Staas & Halsey

(57) ABSTRACT

A computer recovery supporting apparatus and method, and computer recovery supporting program, in which when a failure occurs in a computer, by executing the recovery processing automatically as much as possible, an inappropriate recovery processing due to human error is prevented from being performed while facilitating the recovery operation.

12 Claims, 13 Drawing Sheets

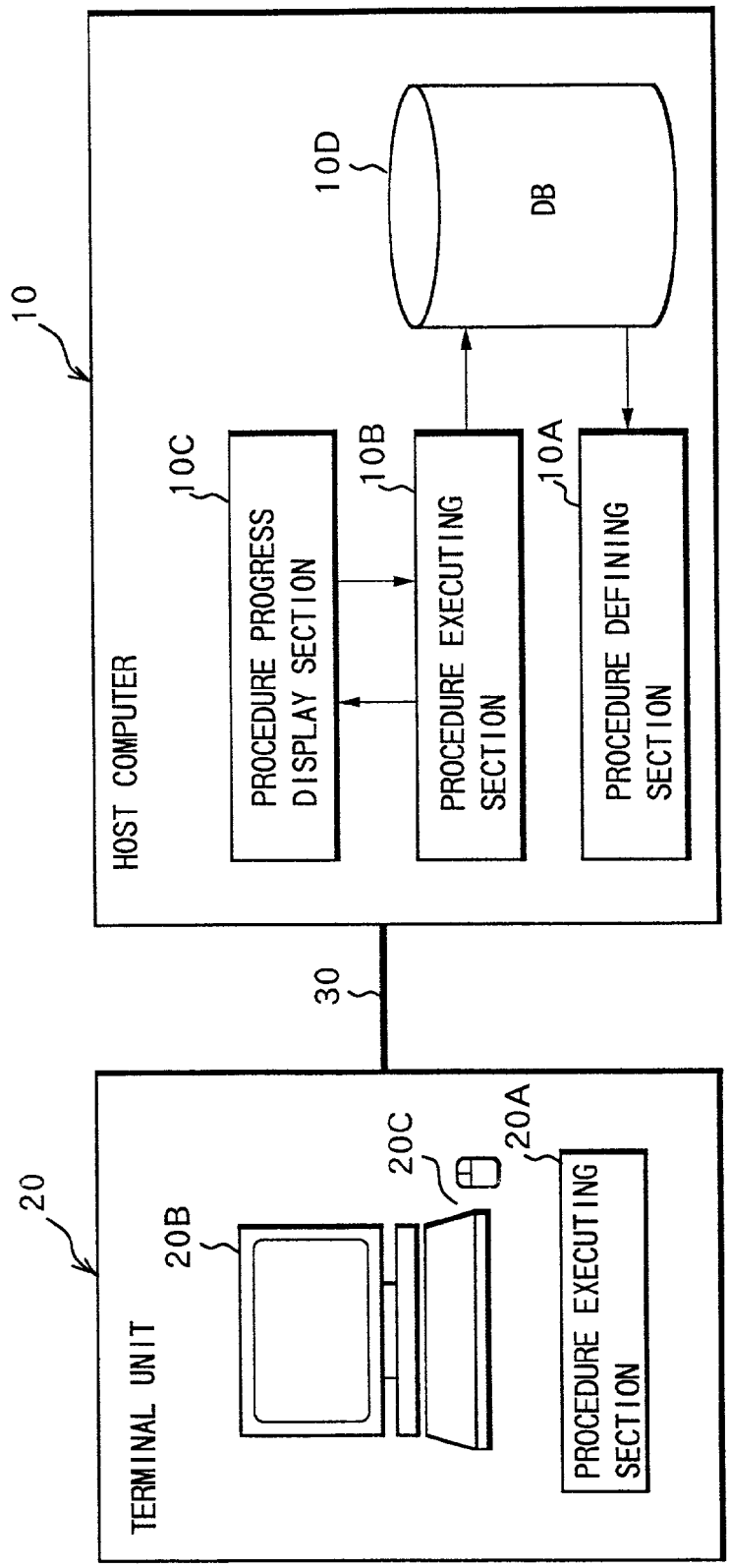

FIG.2A

| \ | TASK BASIC INFORMATION |
|---|---|
| ITEM NAME | CONTENTS |
| TASK ID | TASK IDENTIFICATION NUMBER(UNIQUE) |
| TASK NAME | OPERATION NAME |
| TASK TYPE | ·REMOTE COMMAND<br>·LOCAL COMMAND<br>·OPERATOR'S OPERATION |
| START CHECK CONTROL | SUSPENSION OR NOT AT THE TIME OF START |
| TERMINATION CHECK CONTROL | SUSPENSION OR NOT AT THE TIME OF TERMINATING |
| EXECUTION HOST NAME | HOST NAME ACTIVATING REMOTE COMMAND |
| EXECUTION COMMAND NAME | REMOTE COMMAND NAME/LOCAL COMMAND NAME |

FIG.2B

| \ | QUEUING TASK INFORMATION |
|---|---|
| ITEM NAME | CONTENTS |
| TASK ID | TASK IDENTIFICATION NUMBER(UNIQUE) |
| PRECEDING TASK ID | IDENTIFICATION NUMBER OF PRECEDING TASK |
| PRECEDING TASK NAME | OPERATION NAME OF PRECEDING TASK |
| ACTIVATION CONDITION | ACTIVATION CONDITION WITH RESPECT TO TERMINATION CODE OF PRECEDING TASK |
| TERMINATION CODE | TERMINATION CODE OF PRECEDING TASK |

FIG.2C

| \ | TASK DISPLAY COLOR INFORMATION |
|---|---|
| ITEM NAME | CONTENTS |
| DISPLAY COLOR ID | IDENTIFICATION NUMBER OF DISPLAY COLOR |
| DISPLAY MEANING | SITUATION EXPLANATION |
| DISPLAY CONDITION | WAITING, ACTIVE, TERMINATION CODE CONDITION, ETC. |
| TERMINATION CODE | TERMINATION CODE |
| TASK IDE | TASK IDENTIFICATION NUMBER(UNIQUE) |

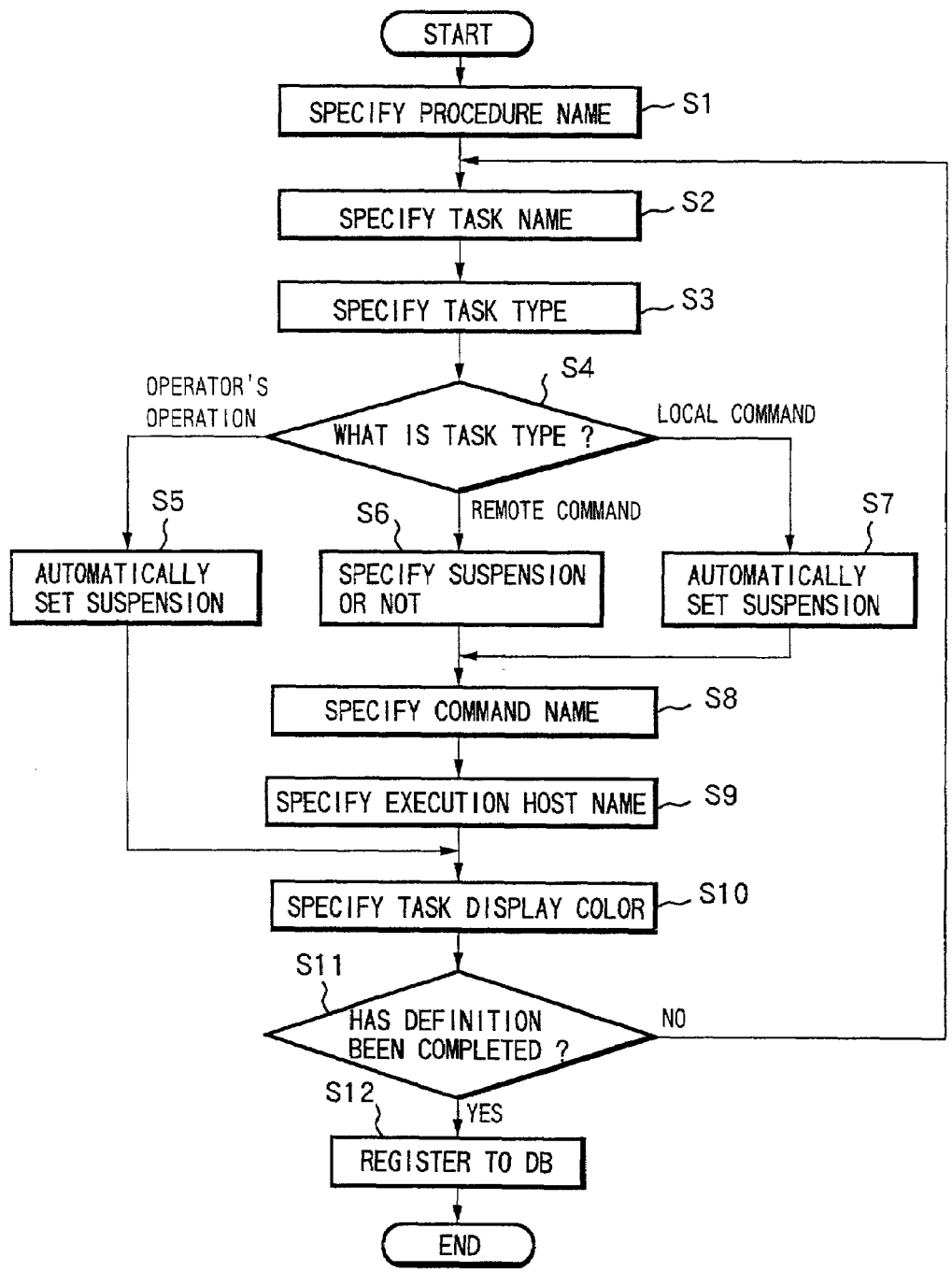

FIG.4A

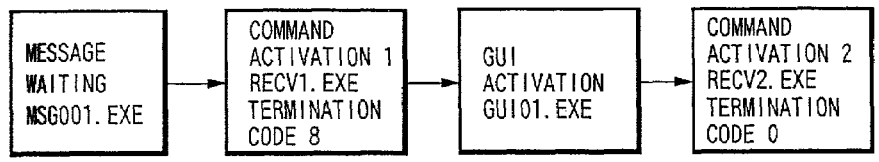

MESSAGE WAITING MSG001.EXE → COMMAND ACTIVATION 1 RECV1.EXE TERMINATION CODE 8 → GUI ACTIVATION GUI01.EXE → COMMAND ACTIVATION 2 RECV2.EXE TERMINATION CODE 0

FIG.4B

| TASK ID | 1 | 2 | 3 | 4 |
|---|---|---|---|---|
| TASK NAME | MESSAGE WAITING | COMMAND ACTIVATION 1 | GUI ACTIVATION | COMMAND ACTIVATION 2 |
| TASK TYPE | REMOTE COMMAND | REMOTE COMMAND | LOCAL COMMAND | REMOTE COMMAND |
| START CHECK CONTROL | NO | NO | YES | NO |
| TERMINATION CHECK CONTROL | NO | NO | YES | NO |
| EXECUTION HOST NAME | HOSTA | HOSTA | | HOSTA |
| EXECUTION COMMAND NAME | MSG001.EXE | RECV1.EXE | GUI01.EXE | RECV2.EXE |

FIG.4C

| TASK ID | 1 | 2 | 3 | 4 |
|---|---|---|---|---|
| PRECEDING TASK ID | | 1 | 2 | 3 |
| PRECEDING TASK NAME | | MESSAGE WAITING | COMMAND ACTIVATION 1 | GUI ACTIVATION |
| ACTIVATION CONDITION | | NO | = | NO |
| TERMINATION CODE | | | 8 | |

FIG.4D

| DISPLAY COLOR ID | 1 | 2 |
|---|---|---|
| DISPLAY MEANING | NORMAL TERMINATION | ABNORMAL TERMINATION |
| DISPLAY CONDITION | = | != |
| TERMINATION CODE | 8 | 8 |
| TASK ID | 2 | 2 |

COMPUTER RECOVERY SUPPORTING APPARATUS AND METHOD, AND COMPUTER RECOVERY SUPPORTING PROGRAM

FIELD OF THE INVENTION

The present invention relates to a technique capable of, when a failure occurs in a computer, preventing an inappropriate recovery processing from being performed due to human error while easily recovering from the failure.

RELATED ART

Failures such as system down may occur in a computer, due to a failure of apparatus and equipment, abnormal environmental conditions such as power supply or temperature, error data or a bug in a program. Therefore, there has been proposed a technique which improves the recovery operation efficiency by monitoring the computer system and the network at all times, and when a failure occurs, displaying a workflow in which a recovery procedure is shown as a flow.

The workflow, however, indicates only the recovery procedure. Hence, an operator has to sequentially input, from a terminal unit, with command names for executing the command necessary for the recovery processing, while referring to the workflow. Therefore, the operator has to input with command names, while paying attention to the order of the recovery processing. As a result, the recovery operation efficiency is not so good. Depending on the kind of recovery processing, it is necessary to specify an option for the command according to the recovery situation, or to dynamically change the recovery procedure thereafter. In this case, there is a possibility that an inappropriate recovery processing is executed due to human error such as erroneous input of the option, or misconception of the recovery situation.

SUMMARY OF THE INVENTION

In view of the above conventional problems, it is an object of the present invention to provide a computer recovery supporting technique, in which when a failure occurs in a computer, an inappropriate recovery processing is prevented from being performed due to human error by executing the recovery processing automatically as much as possible, while facilitating a recovery operation.

In order to achieve the above object, in the computer recovery supporting technique according to the present invention, when executing a procedure which specifies a computer recovery procedure by combining a task for activating a local command having a user interface, a task for activating a remote command to be executed in the background and a task which requires an operator operation, tasks suitable for preset execution conditions are sequentially executed with progress of the procedure, and when the local command or the remote command that has been activated by the task is terminated abnormally, the procedure is terminated forcibly. At this time, the task to be executed may be determined by judging the compatibility of the execution conditions based on an execution result of the preceding task.

According to such a construction, when a failure occurs in the computer system, a procedure which specifies the recovery procedure is executed. At this time, since tasks suitable for preset execution conditions are sequentially executed with progress of the procedure, the procedure is automatically and dynamically changed in accordance with the recovery situation. Therefore, at the time of execution of the task, occurrence of human error is suppressed, thereby preventing the inappropriate recovery processing from being performed. Also, at the time of execution of a command that requires an option, since the local command having the user interface is activated, it can be easily recognized that an option is required. Hence, the operator needs only to specify a necessary option, only when the user interface is displayed, thereby reducing labor. On the other hand, when the local command or the remote command that has been activated by the task is terminated abnormally, the procedure is terminated forcibly, thereby preventing the inappropriate recovery processing from being continued.

At the time of starting or terminating execution of the task for activating a local command, the progress of the procedure is suspended, making it possible to specify whether or not the procedure is to be terminated, and the procedure may be forcibly terminated depending on the specified content.

According to such a construction, when the procedure is suspended, the procedure can be forcibly terminated at any time. Therefore, for example, when a small failure and a significant failure occur at the same time, the significant failure is given priority to be recovered, thereby preventing the computer system from being crashed completely.

Moreover, the progress of the procedure may be displayed. At this time, preferably the execution condition of each task is displayed in a separate color. Then, the operator can confirm the progress of the procedure according to need. If the execution condition of each task is displayed by color, the execution condition can be understood at a glance.

In addition, when a local command cannot be activated depending on the task, a command having the same name is retrieved from other directories, or commands having a similar name are retrieved, to display a list of retrieved commands, and a command to be activated may be specified from these commands. Thereby, the command can be activated regardless of the operation mode of the computer system, and generality can be added.

Other objects and various aspects of the present invention will become apparent from the following description relating to an embodiment, with reference to the accompanying drawings.

BRIEF EXPLANATION OF THE DRAWINGS

FIG. 1 is a block diagram showing an overall recovery supporting apparatus according to the present invention;

FIG. 2 shows the configuration of procedures, in which FIGS. 2A to 2C are explanatory diagrams for task basic information, queuing task information and task display color information, respectively;

FIG. 3 is a flowchart of procedure defining processing in a host computer;

FIG. 4 shows one example of a procedure, in which FIGS. 4A to 4D is a block diagram of the procedure, and explanatory diagrams for task basic information, queuing task information and task display color information, respectively;

PREFERRED EMBODIMENT

Figure 5:
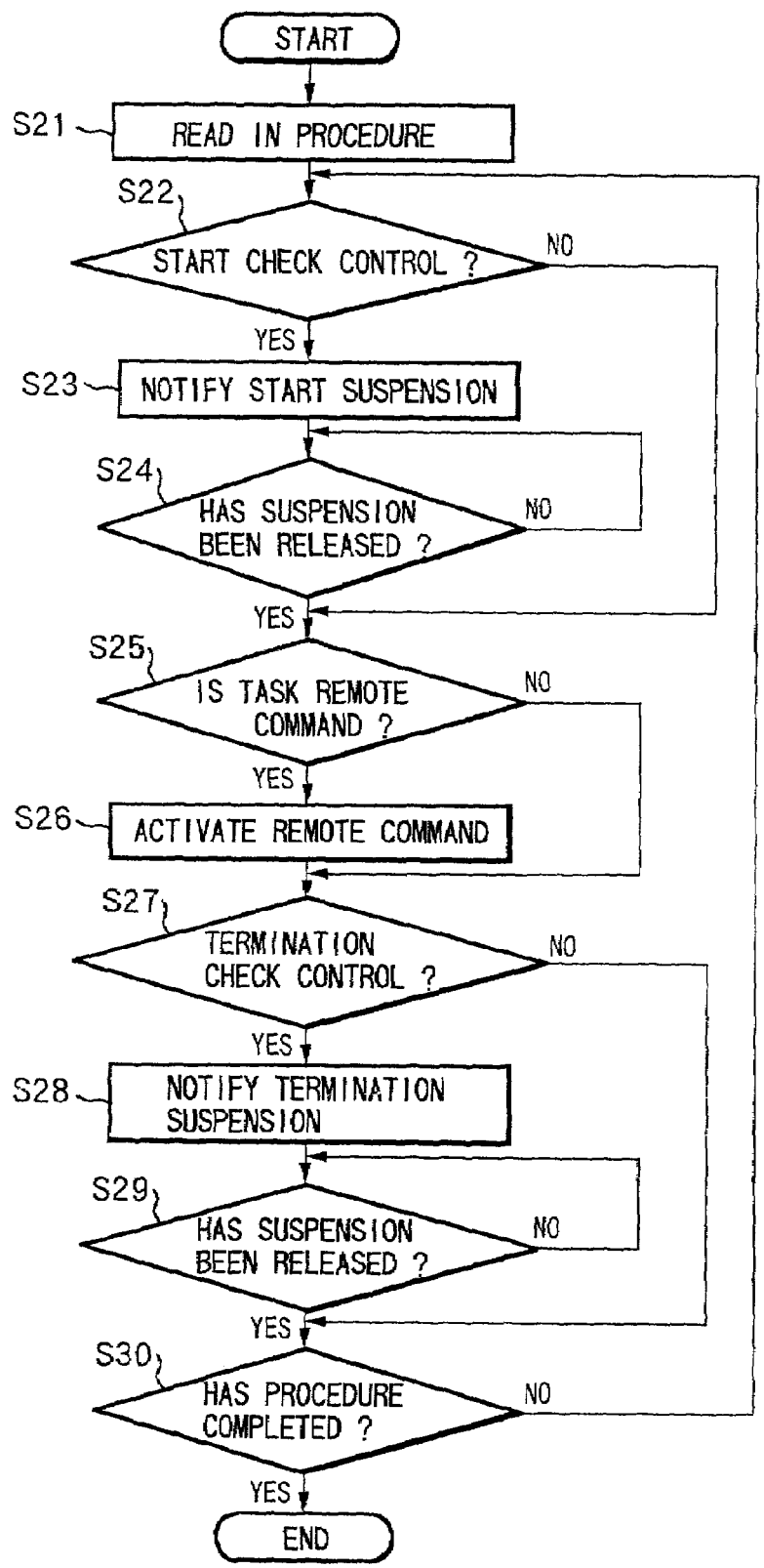
FIG. 5 is a flowchart of procedure execution processing in a host computer.

The present invention will be described in detail, with reference to the accompanying drawings.

FIG. 1 shows the overall configuration of a computer recovery supporting apparatus (hereinafter referred to as a recovery supporting apparatus) that has embodied the present invention.

The recovery supporting apparatus comprises a host computer 10 and at least one terminal unit 20. The host computer 10 and the terminal unit 20 are connected to each other via a dedicated line 30 such as an optical fiber, and various functions related to recovery support are realized in accordance with a program loaded in a memory.

The host computer 10 comprises a procedure defining section 10A, a procedure executing section 10B, a procedure progress display section 10C and a database (hereinafter referred to as "DB") 10D. In the procedure defining section 10A, there is provided a function for defining a procedure to be executed when a failure such as system down occurs. In the procedure executing section 10B, there is provided a function for automatically activating a remote command to be executed in the background, being a task constituting the procedure, when a failure occurs. In the procedure progress display section 10C, there is provided a function for displaying the progress of the procedure on the terminal unit 20. In the DB 10D, the procedure defined via the procedure defining section 10A is registered.

The procedure includes, as shown in FIGS. 2A to 2C respectively, task basic information, queuing task information and task display color information.

The task basic information is for defining a task (operation) for the recovery processing, and at least unique task ID, task name, task type, start check control, termination check control, execution host name and execution command name are set as items. Here, for the task type, "remote command" to be executed in the background, "local command" having a user interface such as GUI (Graphical User Interface) and "operator operation" which requires operator operations such as tape exchange are defined. For the start check control and the termination check control, there is respectively set whether or not the procedure is to be suspended at the time of starting or terminating the task execution. For the execution host name, a host name that identifies the host computer for activating the remote command is set. For the execution command name, a command name that specifies a remote command or a local command is set. For the execution command name, preferably the command name is specified for example by a full path.

The queuing task information is for setting the activation condition under which commands for each task are activated, and at least unique task ID, preceding task ID, preceding task name, activation condition and termination code are set as items. A task ID for the task basic information is set for the task ID, to thereby relate the task ID with the task basic information. For the preceding task ID and the preceding task name, the task ID and the task name of the task to be executed earlier are set. For the activation condition, the condition with respect to the termination code of the preceding task (for example, =, !=, <, >, or, between, non) is set. For the termination code, a code (numerical value or the like) for judging whether or not the preceding task has been normally terminated is set. If the activation condition and the condition specified by the termination-code are realized, the task command specified by the task ID is automatically activated.

The task display color information is for defining the display color representing, for example, normal termination and abnormal termination by color, so that the execution condition of each task can be understood at a glance, and at least display color ID, display meaning, display condition, termination code and task ID are set as items. For the display color ID, an identification number that specifies the display color is set. For the display meaning, an explanation representing the execution condition of the task is set. For the display condition, a condition for determining the display color of the task is set. For the termination code, a termination code of a task specified by the task ID is set.

On the other hand, the terminal unit 20 is provided with a procedure executing section 20A, a display unit 20B such as a CRT (Cathode Ray Tube) for displaying the progress of the procedure, and an input unit 20C comprising a keyboard and a mouse. In the procedure executing section 20A, there is provided a function for automatically activating a local command, being a task constituting the procedure, when a failure occurs.

A task execution device, abnormal termination device, termination specifying device, forcible termination device, task execution function, abnormal termination function, termination specifying function and forcible termination function are realized by the procedure executing section 10B and the procedure executing section 20A. A progress display device and a progress display function are also realized by the procedure progress display section 10C and the display unit 20B.

The processing contents to be executed by the host computer 10 and the terminal unit 20 will now be described.

FIG. 3 shows the procedure defining processing, which is executed under instruction of the operator via the terminal unit 20, in the procedure defining section 10A of the host computer 10.

In step 1 (in the figure, abbreviated as "S1", and denoted similarly hereunder), a procedure name that specifies the procedure corresponding to the failure content is specified. Preferably, the procedure name is specified as, for example, "order receiving server recovery", so that the failure content can be easily anticipated.

In step 2, a task name constituting the procedure is specified. At this time, the task ID is automatically added so as to become unique in the recovery supporting apparatus. Also, the queuing task information is set together, so as to set the activation condition of the command in the task.

In step 3, the task type, that is, remote command, local command or operator operation is specified.

In step 4, a branch processing corresponding to the task type is performed. That is to say, when the task type is the operator operation, control proceeds to step 5. When the task type is the remote command, control proceeds to step 6, and when the task type is the local command, control proceeds to step 7.

In step 5, a processing when the task type is the operator operation is performed. That is to say, when the operator operates, an operation confirmation is required at the time of starting and terminating the task execution. Therefore, in order to suspend the procedure, the start check control and the termination check control in the task basic information are set to "Yes" automatically. Thereafter, control proceeds to step 10.

In step 6, the processing when the task type is the remote command is performed. That is to say, since the remote command is generally executed in the background, suspension of the procedure is not necessary. But there may be a case where it is desirable to forcibly terminate the procedure as required, and hence at the time of starting and terminating the task execution, it is specified whether or not to suspend the procedure. Thereafter, control proceeds to step 8.

In step 7, the processing when the task type is the local command is performed. That is to say, the local command requires a command option input operation by the operator at the time of task execution. Therefore, in order to suspend the procedure, the start check control and the termination check control in the task basic information are set to "Yes" automatically. Thereafter, control proceeds to step 8.

In step 8, a command name specifying the command is specified.

In step 9, a host name specifying the host computer which executes the command is specified.

In step 10, each item in the task basic information is specified in order to display the procedure progress by color.

In step 11, it is judged whether or not the defining of the procedure has been completed. When the defining of the procedure has been completed, control proceeds to step 12 (Yes), and the task basic information, the queuing task information and the task display color information constituting the procedure are registered in the DB 10D. On the other hand, if the defining of the procedure has not been completed, control returns to step 2 (No).

According to the procedure defining processing in FIG. 3, the procedure corresponding to the failure content is registered in the DB 10D. For example, if it is a procedure as shown in FIG. 4A, the task basic information, the queuing task information and the task display color information shown in FIG. 4B to FIG. 4D are respectively registered in the DB 10D. The task display color information shown in FIG. 4D is related to "command activation 1", being the remote command, and the task display color information related to other tasks is similarly set according to need.

FIG. 5 shows a procedure execution processing to be executed in the procedure executing section 10B of the host computer 10, when a procedure is specified from the recovery procedure list, or when a procedure corresponding to the failure content is automatically specified.

In step 21, the specified procedure is read in from the DB 10D. In the steps thereafter, processing is performed sequentially for respective tasks basic information constituting the procedure.

In step 22, it is judged whether or not the procedure is to be suspended at the time of starting the task execution, based on the set content for the start check control in the task basic information. If the procedure is to be suspended, control proceeds to step 23 (Yes), while if the procedure is not to be suspended, control proceeds to step 25 (No).

In step 23 and step 24, processing for suspending the procedure at the time of starting the task execution is performed. That is, in step 23, a start suspension notification indicating that the procedure has been suspended is transmitted to the terminal unit 20. In step 24, it is judged whether or not a suspension release notification indicating that suspension of the procedure has been released, has been notified from the terminal unit 20. If the suspension release notification has been notified, control proceeds to step 25 (Yes), while if the suspension release notification has not been notified, control stands by (No).

In step 25, it is judged whether or not the task is the remote command, that is, a command to be executed in the background, based on the set content for the task type in the task basic information. If the task is the remote command, control proceeds to step 26 (Yes), where the remote command specified by the execution command name is activated in the host computer specified by the execution host name in the task basic information. Here, the remote command is activated when the preceding task is normally terminated, based on the set content in the queuing task information. When the preceding task is abnormally terminated, the procedure is forcibly terminated, in order to prevent an inappropriate recovery processing from being performed. On the other hand, if the task is not the remote command, control proceeds to step 27 (No).

In step 27, it is judged whether or not the procedure is to be suspended at the time of terminating the task execution, based on the set content for the termination check control in the task basic information. If the procedure is to be suspended, control proceeds to step 28 (Yes), while if the procedure is not to be suspended, control proceeds to step 30 (No).

In step 28 and step 29, processing for suspending the procedure at the time of terminating the task execution is performed. That is, in step 28, a termination suspension notification indicating that the procedure has been suspended is transmitted to the terminal unit 20. In step 29, it is judged whether or not a suspension release notification indicating that suspension of the procedure has been released has been notified from the terminal unit 20. If the suspension release notification has been notified, control proceeds to step 30 (Yes), while if the suspension release notification has not been notified, control stands by (No).

In step 30, it is judged whether or not the procedure has been completed, that is, whether or not all the processing in the task basic information has been completed. If the procedure has been completed, the procedure execution processing is terminated (Yes), while if the procedure has not been completed, control returns to step 22 (No).

Figure 6:
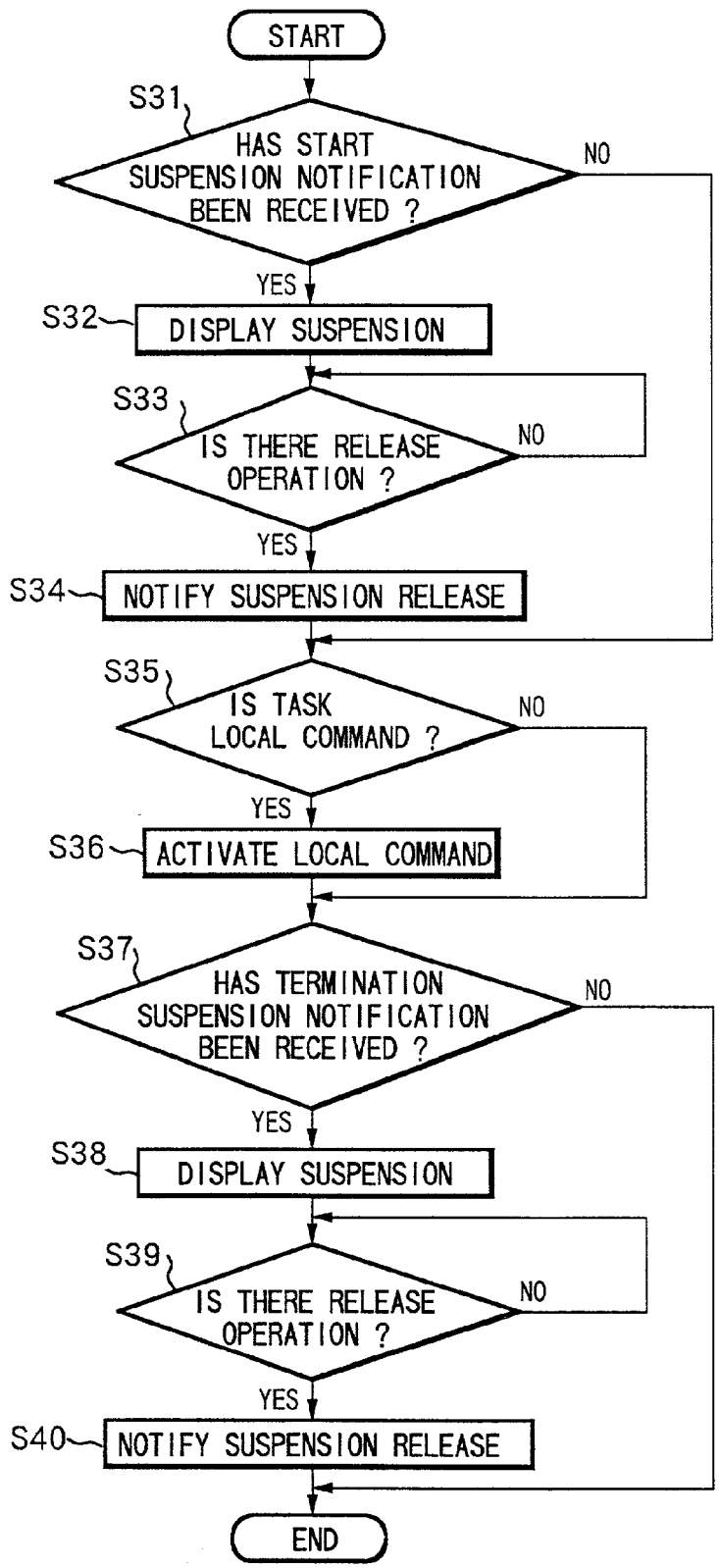
FIG. 6 is a flowchart of procedure execution processing in a terminal unit.

FIG. 6 shows a procedure execution processing to be executed in the procedure executing section 20A of the terminal unit 20, synchronously with the time when respective tasks basic information is processed by the host computer 10.

In step 31, it is judged whether or not the start suspension notification has been received from the host computer 10. If the start suspension notification has been received, control proceeds to step 32 (Yes), while if the start suspension notification has not been received, control proceeds to step 35 (No).

In step 32 to step 34, a processing for suspending the procedure at the time of starting the task execution is performed. That is, in step 32, it is displayed on the display unit 20B that the procedure has been suspended, to thus notify this matter to the operator. In step 33, it is judged whether or not the suspension release operation has been performed by the operator. If the suspension release operation has been performed, control proceeds to step 34 (Yes), and the suspension release notification is transmitted to the host computer 10. On the other hand, if the suspension release operation has not been performed, control stands by (No).

In step 35, it is judged whether or not the task is the local command, that is, a command having a user interface, based on the set content for the task type in the task basic information. If the task is the local command, control proceeds to step 36 (Yes), where the local command specified by the execution command name is activated. Here, the local command is activated when the preceding task is normally terminated, in the same manner as the remote command, based on the set content for the queuing task information. When the preceding task has been terminated abnormally, the procedure is terminated forcibly in order to prevent an inappropriate recovery processing from being performed. On the other hand, if the task is not the local command, control proceeds to step 37 (No).

In step 37, it is judged whether or not the termination suspension notification has been received from the host computer 10. If the termination suspension notification has been received, control proceeds to step 38 (Yes), while if the termination suspension notification has not been received, the procedure execution processing is terminated (No).

In step 38 to step 40, a processing for suspending the procedure at the time of terminating the task execution is performed. That is to say, in step 38, it is displayed on the display unit 20B that the procedure has been suspended, to thus notify this matter to the operator. In step 39, it is judged whether or not the suspension release operation has been performed by the operator. If the suspension release operation has been performed, control proceeds to step 40 (Yes), where the suspension release notification is transmitted to the host computer 10. On the other hand, if the suspension release operation has not been performed, control stands by (No).

According to the procedure execution processing in FIG. 5 and FIG. 6, when a failure occurs, tasks for performing recovery processing are automatically executed one after another, based on the procedure registered in the DB 10D. At this time, the command activated by each task is automatically activated in accordance with the execution result of the preceding task, hence command name input operation by the operator is not necessary. As a result, labor required for recovery is reduced. On the other hand, the command for each task is not activated when the preceding task is abnormally terminated, thereby preventing an inappropriate recovery processing from being performed.

In executing a command requiring an option, since the local command having a user interface is automatically activated, it is recognized that the option is required. Therefore, the operator needs only to specify an option required for the execution of the command, when the user interface is displayed, and hence labor can be reduced.

Moreover, with the progress of the procedure, tasks suitable for the execution condition set in advance are executed one after another, thereby enabling the recovery procedure thereafter to be changed automatically and dynamically.

Accordingly, the operator needs only to perform the necessary minimum operation, thereby preventing an inappropriate recovery processing from being performed due to human error, while making recovery easy.

In the task that activates the local command, if the command described in a full path cannot be activated, the following action may be taken. That is to say, when there is a plurality of terminal units 20, the configurations thereof may not necessarily be the same. In this case, since the storage place for the commands are not necessarily the same, a command having the same name in another directory is retrieved, and displayed in a list, so as to be selected by the operator. Since there may be a version whose function is strengthened in a command, a command having a similar name may be retrieved using a so-called "wild card", and displayed in a list, so as to be selected by the operator. In this manner, the command can be activated regardless of the operation mode of the computer system, thereby adding generality.

Here a first retrieval device, second retrieval device, list display device and command activation device are realized by such processing.

In the above described recovery supporting apparatus, the procedure progress as shown in FIG. 7 to FIG. 12 is displayed by the function provided by the procedure progress display section 10C of the host computer 10. Here, as shown in the figures, each task is displayed in a rectangular shape added with the task name, starting date and time, terminating date and time and a termination code. The order for executing each task is displayed by an arrow. In the description below, it is assumed that the procedure shown in FIG. 4A is executed.

Figure 7:
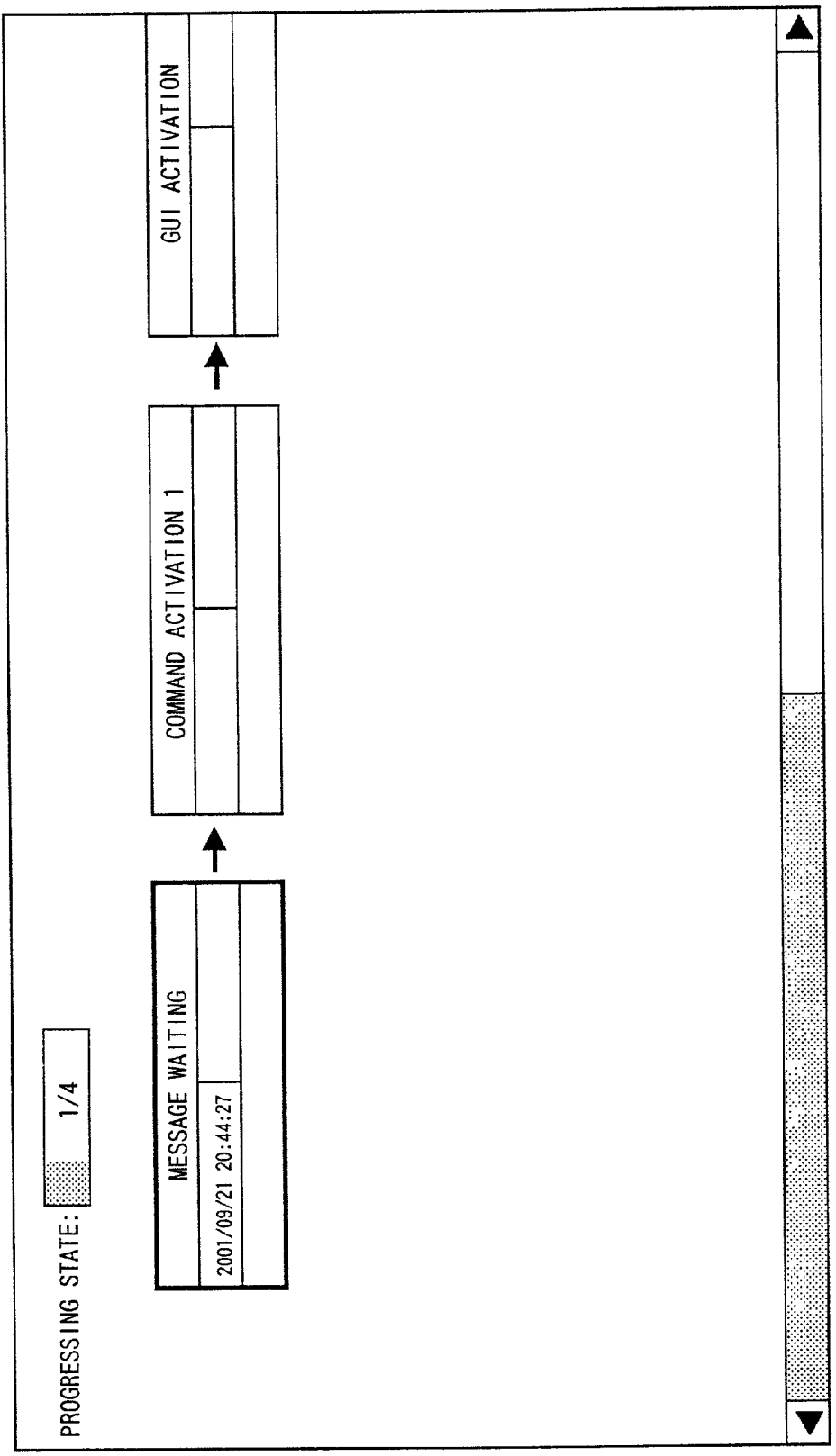
FIG. 7 shows one example of a procedure progress display, being an explanatory diagram for during executing a message waiting task.
Figure 8:
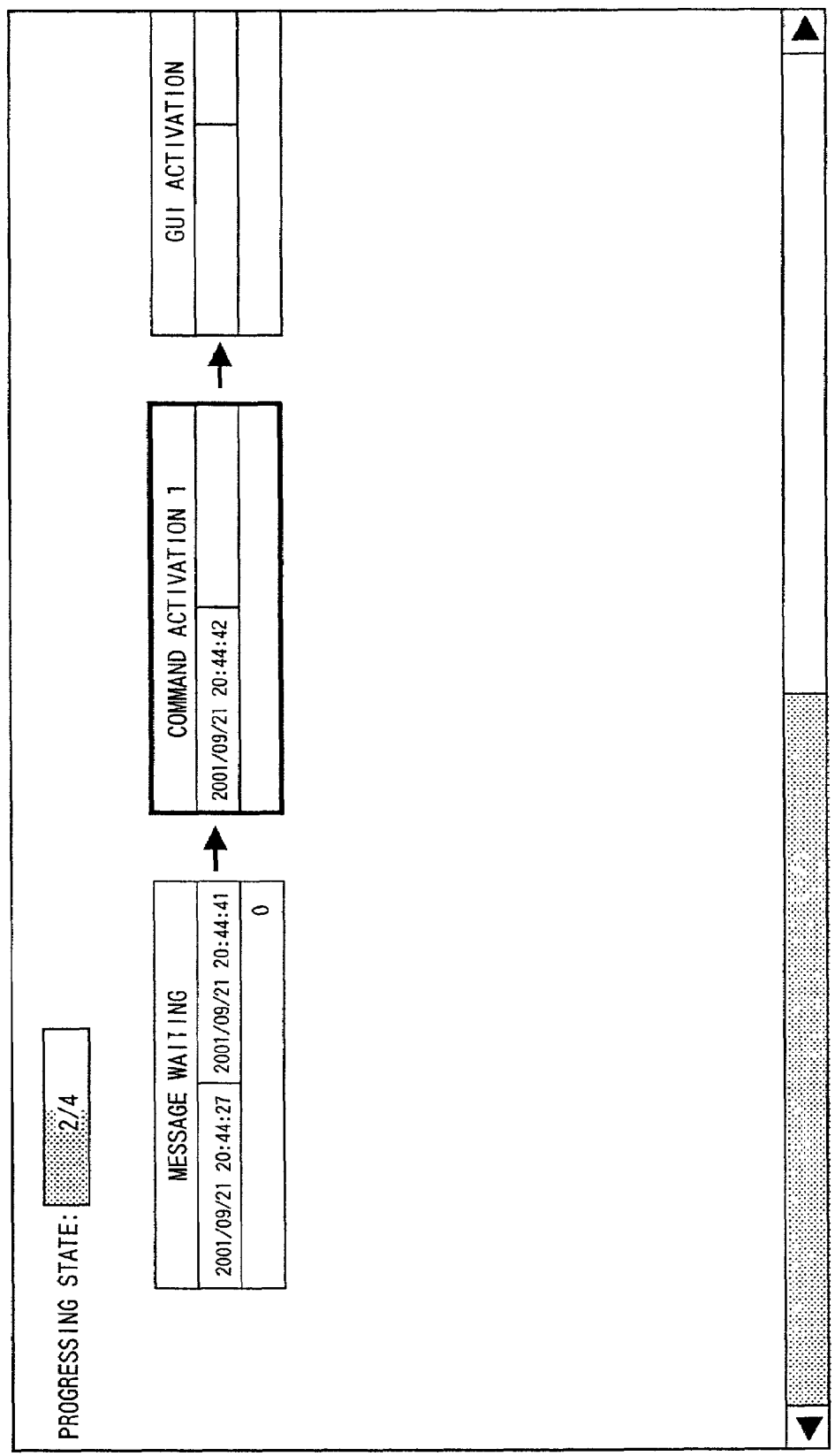
FIG. 8 shows one example of a procedure progress display, being an explanatory diagram for during executing a command activation 1 task.
Figure 9:
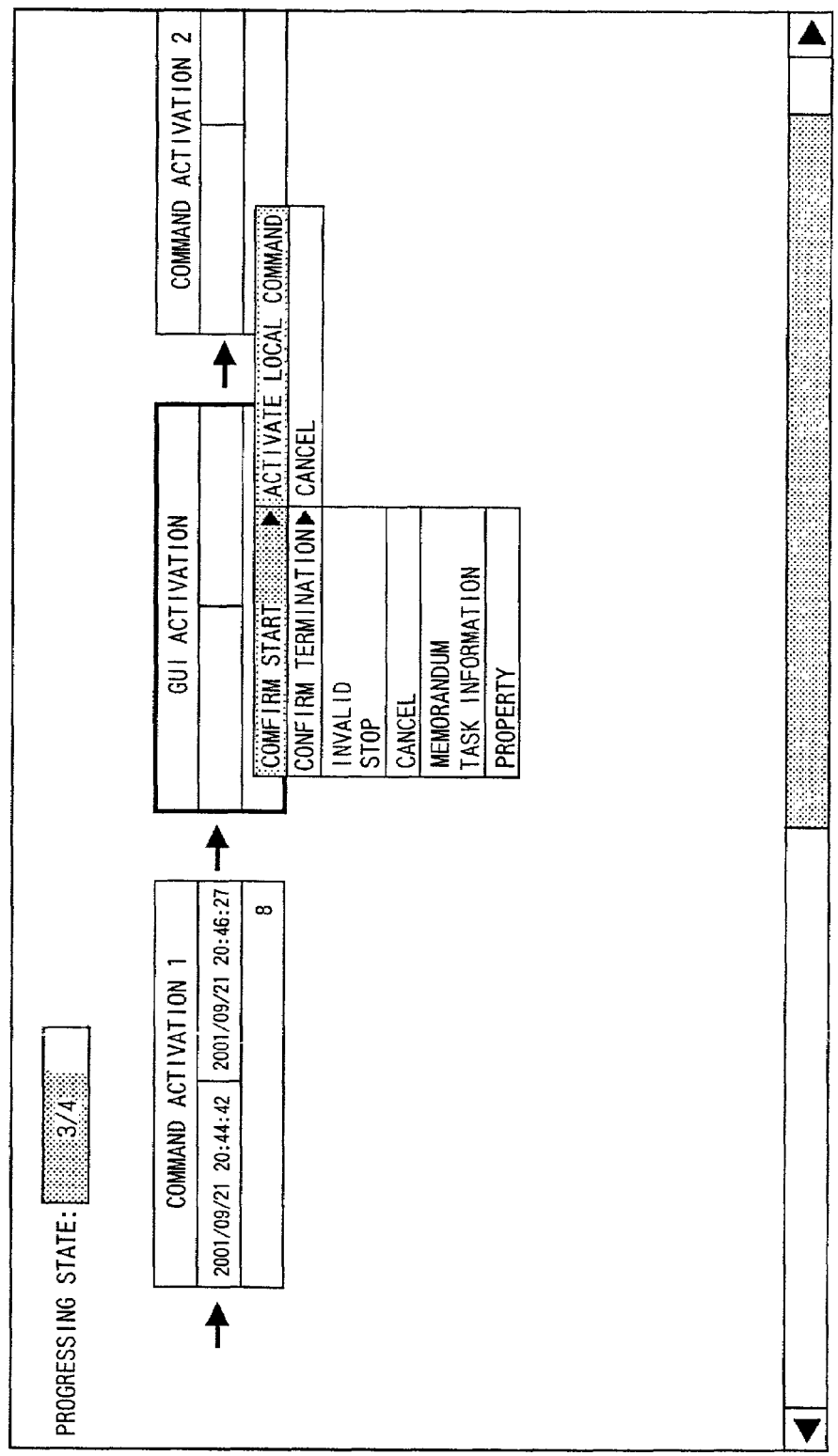
FIG. 9 shows one example of a procedure progress display, being an explanatory diagram for a confirmation operation at the time of starting a GUI activation task.

When the execution of the procedure has been started, as shown in FIG. 7, there is displayed a situation where a message waiting task is being executed. At this time, as the procedure progresses, the message waiting task is displayed in a display color corresponding to the task display color information, and the starting date and time is also displayed. When the message waiting task has been terminated, as shown in FIG. 8, this is displayed in a display color corresponding to the task display color information, and also the terminating date and time, and the termination code thereof are also displayed. The command activation 1 being the subsequent task, is automatically executed, since the message waiting task has been normally terminated, and is displayed in a display color corresponding to the task display color information, and also the starting date and time thereof is also displayed. When the task for command activation 1 has been terminated, as shown in FIG. 9, this is displayed in a display color corresponding to the task display color information (similarly hereinafter), and also the terminating date and time, and the termination code thereof are also displayed.

Figure 10:
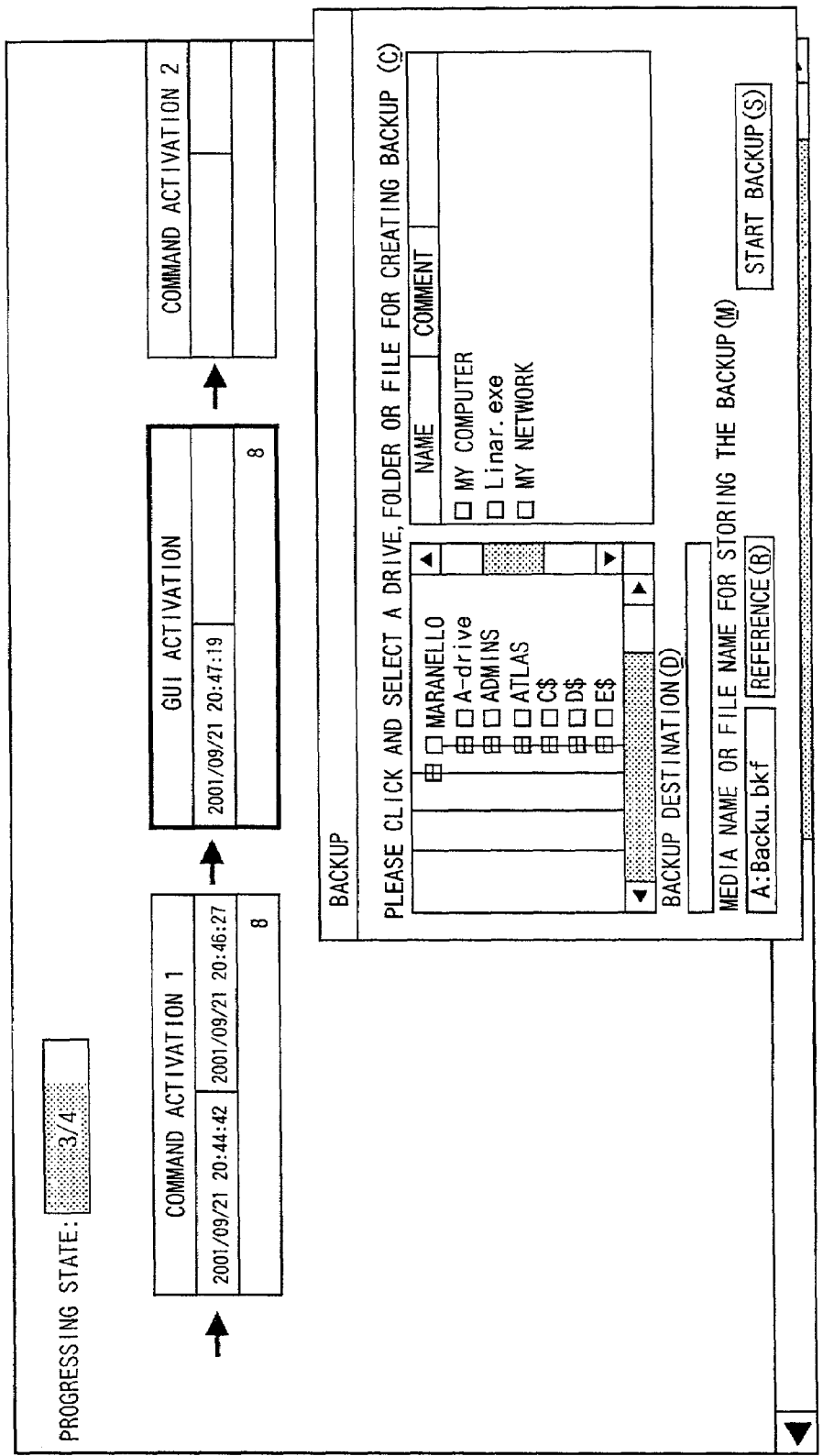
FIG. 10 shows one example of a procedure progress display, being an explanatory diagram for when GUI is activated.
Figure 11:
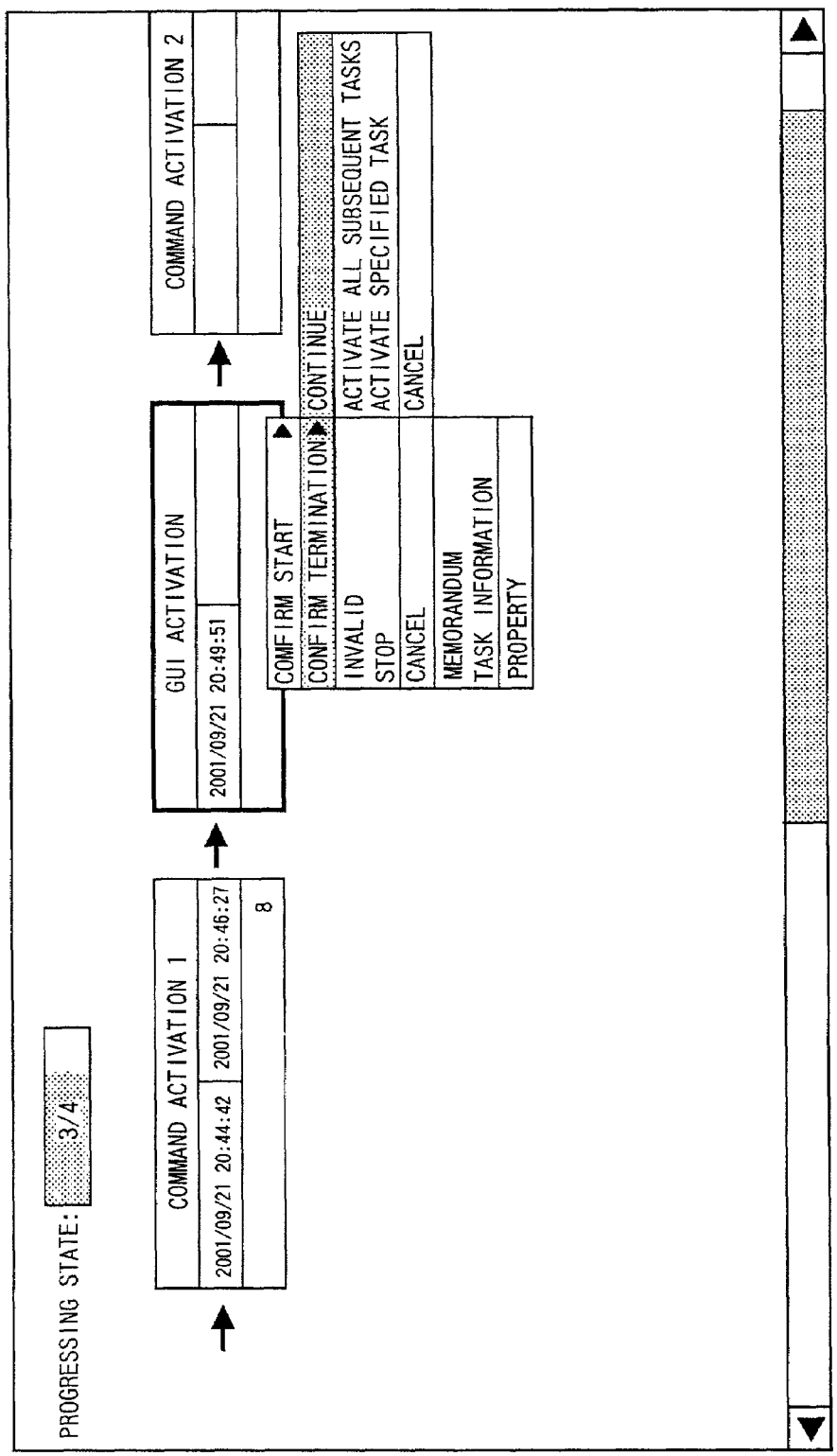
FIG. 11 shows one example of a procedure progress display, being an explanatory diagram for a confirmation operation at the time of terminating the GUI activation task.
Figure 12:
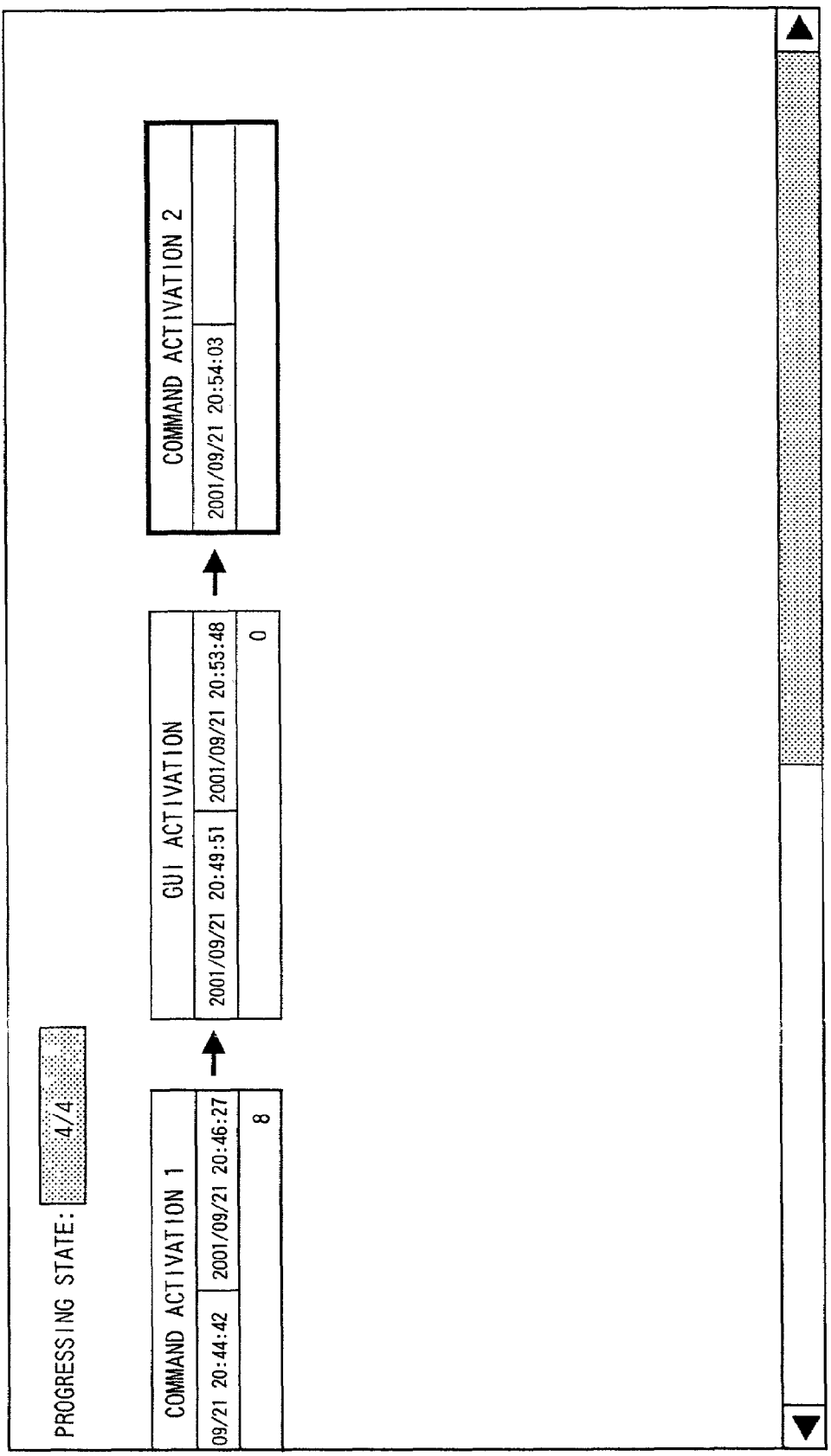
FIG. 12 shows one example of a procedure progress display, being an explanatory diagram for during executing a command activation 2 task.

The GUI activation being the subsequent task to the command activation 1, requires operator's input operation. Therefore, the start check control and termination check control of the task basic information are set to "Yes" (see FIG. 4B). Accordingly, the procedure is suspended, and a pop-up menu for promoting the operator confirmation is displayed. When the operator specifies "confirm start" and "activate local command", a dialog box as the GUI is displayed as shown in FIG. 10. At this time, the activation date and time thereof is displayed in the task for GUI activation. When the input operation in the dialog box is completed, the procedure is again suspended, and a pop-up menu for prompting the operator confirmation is displayed as shown in FIG. 11. When the operator specifies "confirm termination" and "continue", as shown in FIG. 12, the termination date and time, and the termination code thereof are displayed in the task for the GUI activation. Moreover, the command activation 2 being the subsequent task, is activated, and the starting date and time thereof is displayed.

Therefore, when a failure occurs, the operator can confirm the progress of the recovery processing at anytime, by watching the procedure progress displayed on the display unit 20B of the terminal unit 20. At this time, since the execution condition of each task is displayed by color, the operator can confirm the execution condition at a glance. In the case where the procedure is suspended, the procedure can be forcibly terminated from the pop-up menu at anytime. Hence, when for example a small failure and a significant failure occur at the same time, the significant failure is given priority to be recovered, thereby preventing the computer system from being crashed completely.

Figure 13:
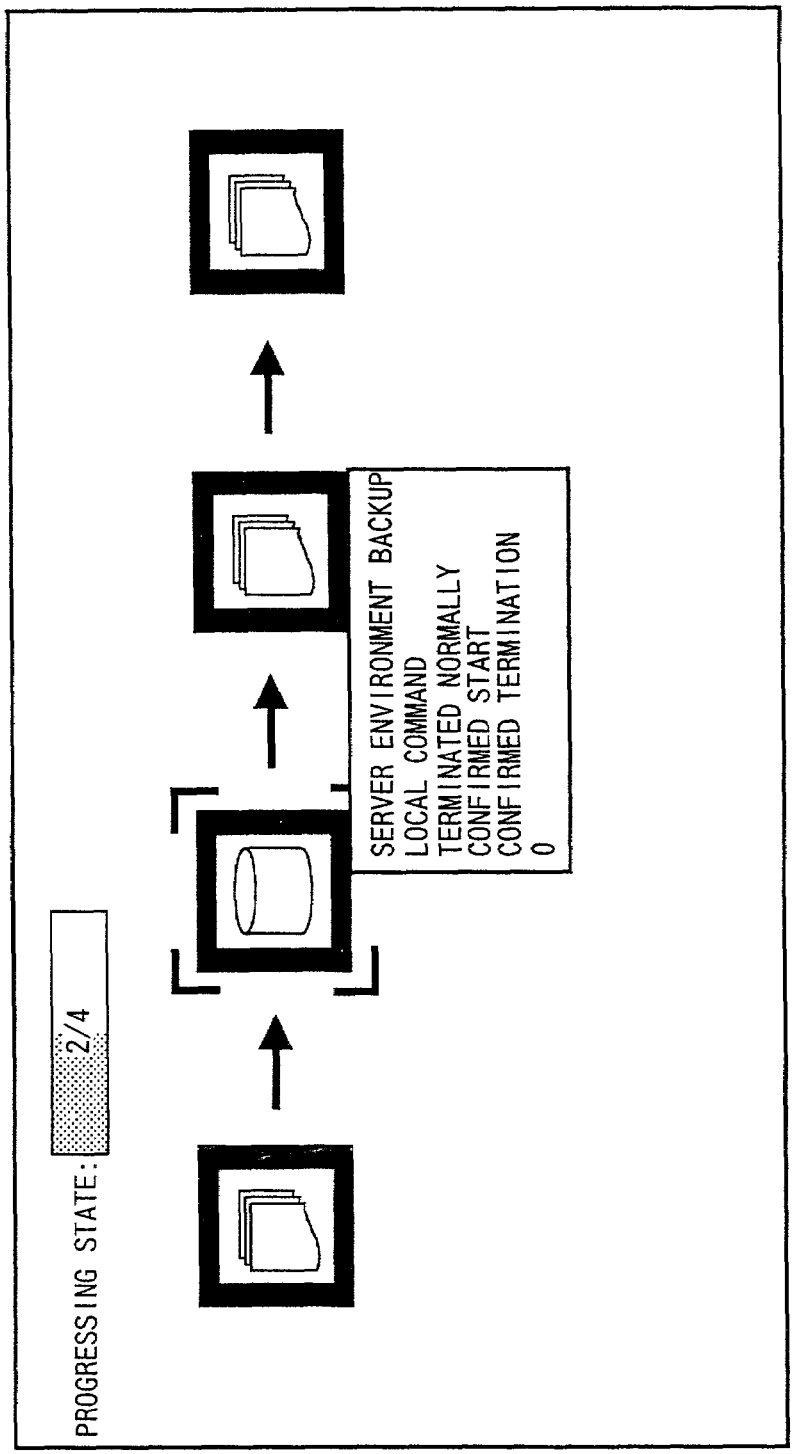
FIG. 13 is a diagram showing another example of the procedure progress display.

The procedure progress may be displayed by icons, as shown in FIG. 13.

If the recovery supporting program according to the present invention is entered in a server connected to the Internet, the recovery supporting apparatus according to the present invention can be easily constructed, by downloading such a program via a telecommunication line.

What is claimed is:

1. A computer recovery supporting apparatus, which executes a procedure which specifies a computer recovery procedure by combining a task for activating a local command having a user interface, a task for activating a remote command to be executed in the background, and a task which notices an operator for operator operation, comprising: task execution means for sequentially executing tasks suitable for preset execution conditions, with progress of the procedure', and abnormal termination means for forcibly terminating said procedure when the local command or the remote command that has been activated by said task is terminated abnormally; and retrieval means for, when a local command cannot be activated depending on said task, retrieving a command having the same name as said local command from another directory;

list display means for displaying a list of commands retrieved by a retrieval means;

and command activation means for activating a command specified from amongst the list of commands displayed by said list display means.

2. A computer recovery supporting apparatus which executes a procedure which specifies a computer recovery procedure by combining a task for activating a local command having a user interface, a task for activating a remote command to be executed in the background, and a task which requires operator operation, comprising: task execution means for sequentially executing tasks suitable for preset execution conditions, with progress of the procedure; abnormal termination means for forcibly terminating said procedure when the local command or the remote command that has been activated by said task is terminated abnormally; retrieval means for, when a local command cannot be activated depending on said task, retrieving a command having a similar name to said local command; list display means for displaying a list of commands retrieved by a retrieval means; and command activation means for activating a command specified from amongst the list of commands displayed by said list display means.

3. A computer recovery supporting apparatus according to claim 1 further comprising progress display means for displaying the progress of said procedure.

4. A computer recovery supporting apparatus according to claim 3, wherein said progress display means displays the execution condition of said each task in a separate color.

5. A computer recovery supporting apparatus according to claim 1, wherein said task execution means judges the compatibility of said execution conditions based on an execution result of the preceding task.

6. A computer recovery supporting apparatus which executes a procedure which specifies a computer recovery procedure by combining a task for activating a local command having a user interface, a task for activating a remote command to be executed in the background, and a task which requires operator operation, comprising: task execution means for sequentially executing tasks suitable for preset execution conditions, with progress of the procedure; abnormal termination means for forcibly terminating said procedure when the local command or the remote command that has been activated by said task is terminated abnormally; retrieval means for, when a local command cannot be activated depending on said task, retrieving a command having a similar name to said local command; list display means for displaying a list of commands retrieved by said first retrieval means; and command activation means for activating a command specified from amongst the list of commands displayed by said list display means.

7. A computer recovery supporting method, which executes a procedure which specifies a computer recovery procedure by combining a task for activating a local command having a user interface, a task for activating a remote command to be executed in the background, and a task which notifies an operator for operator operation, wherein tasks suitable for preset execution conditions are sequentially executed with progress of the procedure, and when the local command or the remote command that has been activated by said task is terminated abnormally, said procedure is terminated forcibly:

when a local command cannot be activated depending on said task, retrieving a command having the same name as said local command from another directory;

displaying a list of retrieved commands; and activating a command specified from amongst the list of displayed commands.

8. A computer recovery supporting method according to claim 7, wherein at the time of starting or terminating execution of said task for activating a local command, the progress of said procedure is suspended and whether or not said procedure is to be terminated is specified, and said procedure is forcibly terminated, when termination of the procedure is specified.

9. A computer recovery supporting method according to claim 7, wherein the progress of said procedure is displayed.

10. A computer recovery supporting program, stored on a computer readable medium, executing on a computer recovery supporting apparatus, which executes a procedure which specifies a computer recovery procedure by combining a task for activating a local command having a user interface, a task for activating a remote command to be executed in the background, and a task which notices an operator for operator operation, comprising: task execution means for sequentially executing tasks suitable for preset execution conditions, with progress of the procedure', and abnormal termination means for forcibly terminating said procedure when the local command or the remote command that has been activated by said task is terminated abnormally; and a retrieval function for, when a local command cannot be activated depending on said task, retrieving a command having the same name as said local command from another directory;

list display means for displaying a list of commands retrieved by a retrieval function;

and command activation means for activating a command specified from amongst the list of commands displayed by said list display function.

11. A computer recovery supporting program according to claim 10, further comprising: a termination specifying function for, at the time of starting or terminating execution of the task for activating a local command, suspending the progress of said procedure and specifying whether or not said procedure is to be terminated; and a forcible termination function for forcibly terminating said procedure when the termination of the procedure is specified by said termination specifying function.

12. A computer recovery supporting program according to claim 10, further comprising a progress display function for displaying the progress of said procedure.

* * * * *

UNITED STATES PATENT AND TRADEMARK OFFICE
CERTIFICATE OF CORRECTION

PATENT NO. : 7,062,679 B2  Page 1 of 1
APPLICATION NO. : 10/101273
DATED : June 13, 2006
INVENTOR(S) : Jun Yoshii et al.

It is certified that error appears in the above-identified patent and that said Letters Patent is hereby corrected as shown below:

On Title Page Item (74) (Attorney, Agent, or Firm), Line 1, after "Halsey" insert --LLP--.
Column 9, Line 26, change "notices" to --notifies--.
Column 9, Line 29, change "procedure'," to --procedure;--.

Column 9, Line 42-59, delete claim 2 and insert --A computer recovery supporting apparatus according to claim 1 further comprising: termination specifying means for, at the time of starting or terminating execution of said task for activating a local command, suspending the progress of said procedure and specifying whether or not said procedure is to be terminated; and forcible termination means for forcibly terminating said procedure when the termination of the procedure is specified by said termination specifying means.--

Column 10, Line 21, delete "first".
Column 10, Line 34, after "forcibly" change ":" to --;--.
Column 10, Line 57, change "notices" to --notifies--.
Column 10, Line 58, change "comprising: task execution means" to --for realizing on a computer: a task execution function--.
Column 10, Line 60, after "procedure" change " '," to --;--.
Column 10, Line 60, after "and" insert --an--.
Column 10, Line 61, change "means" to --function--.
Column 10, Line 62, change "that" to --which--.
Column 11, Line 1, insert --a-- before "list".
Column 11, Line 1, change "means" to --function--.
Column 11, Line 2, after "a" insert --said--.
Column 11, Line 3, after "and" insert --a--,
Column 11, Line 3, change "means" to --function--.

Signed and Sealed this

Fourteenth Day of November, 2006

JON W. DUDAS